(No Model.) 8 Sheets—Sheet 5.

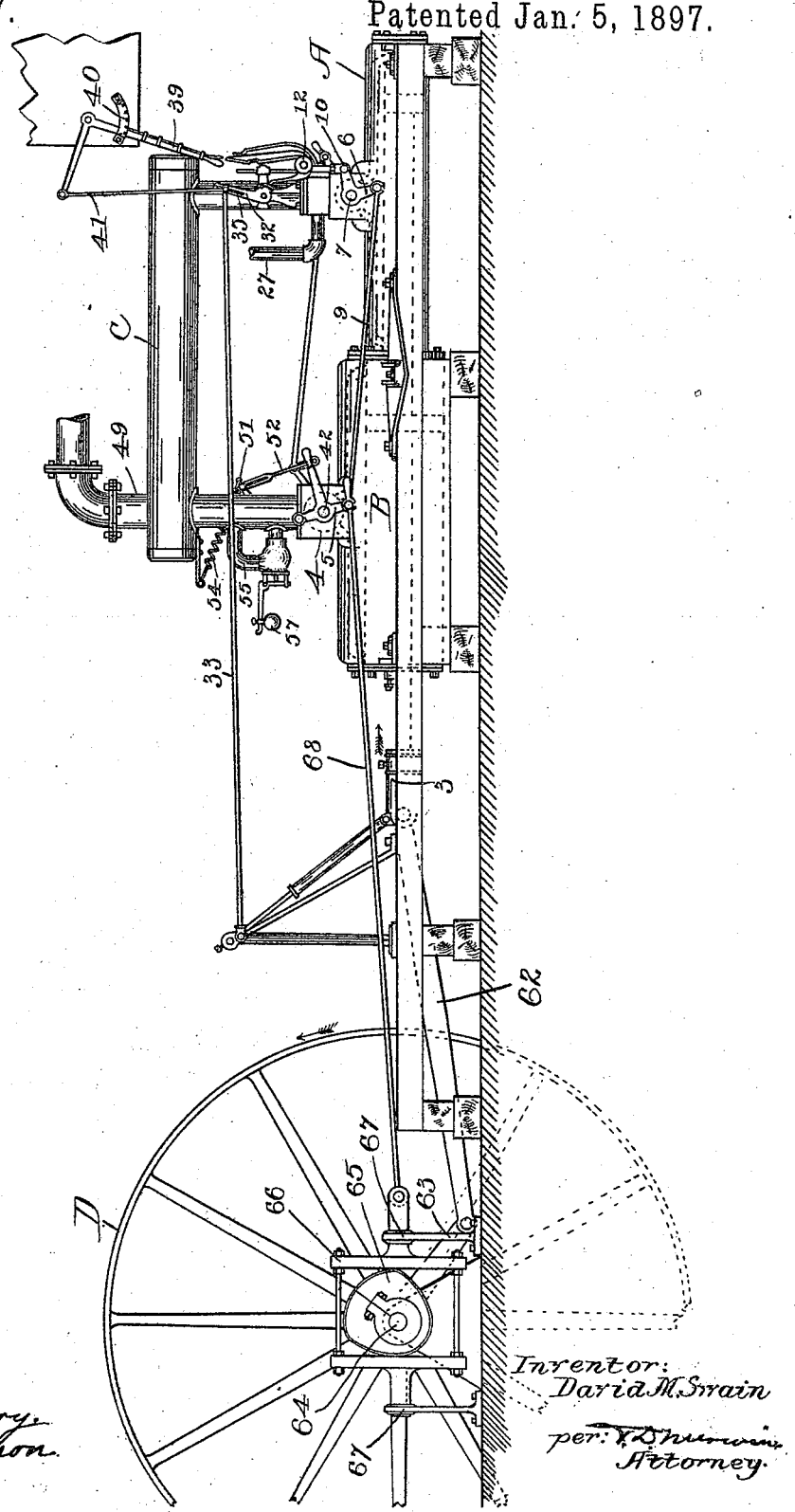

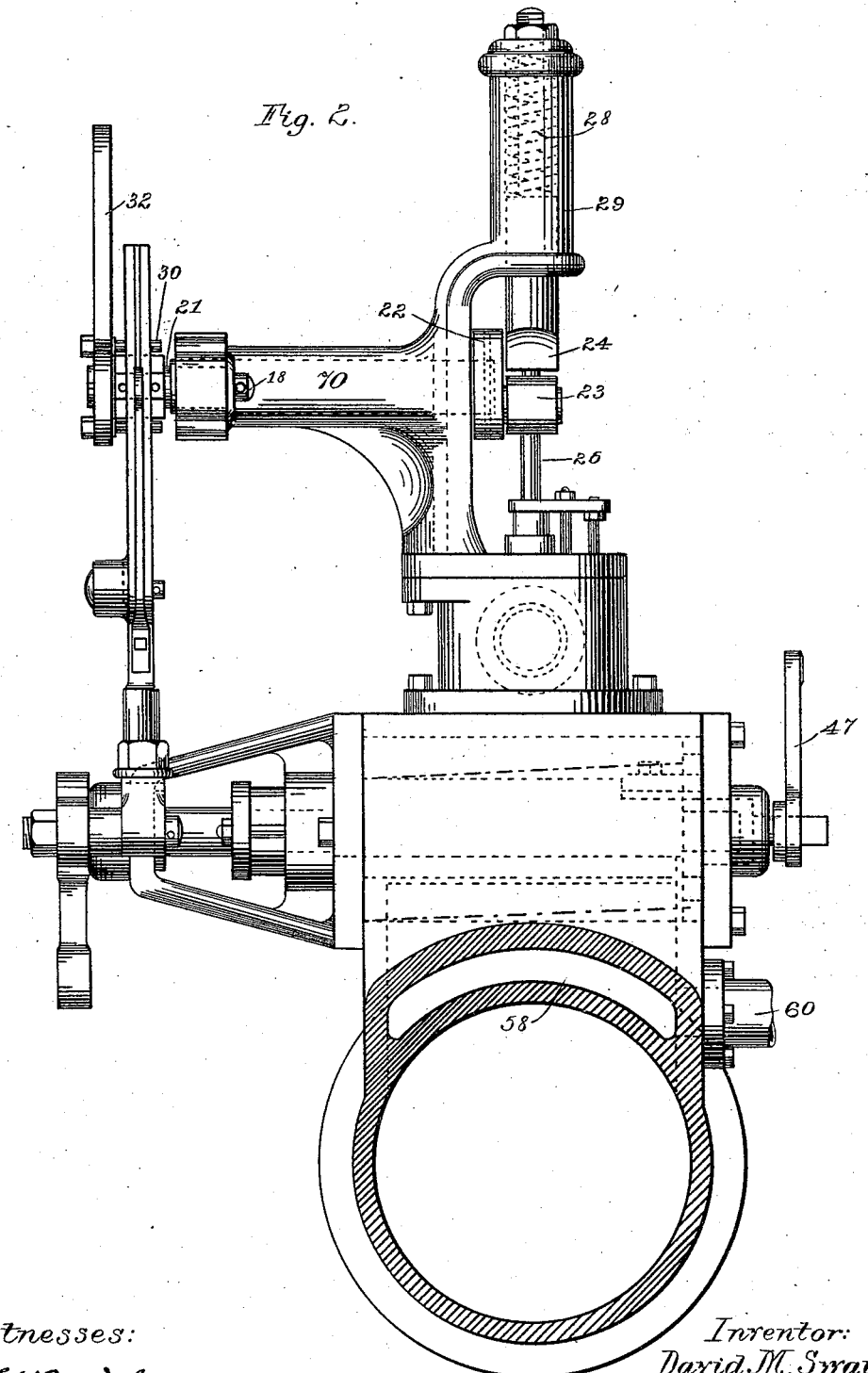

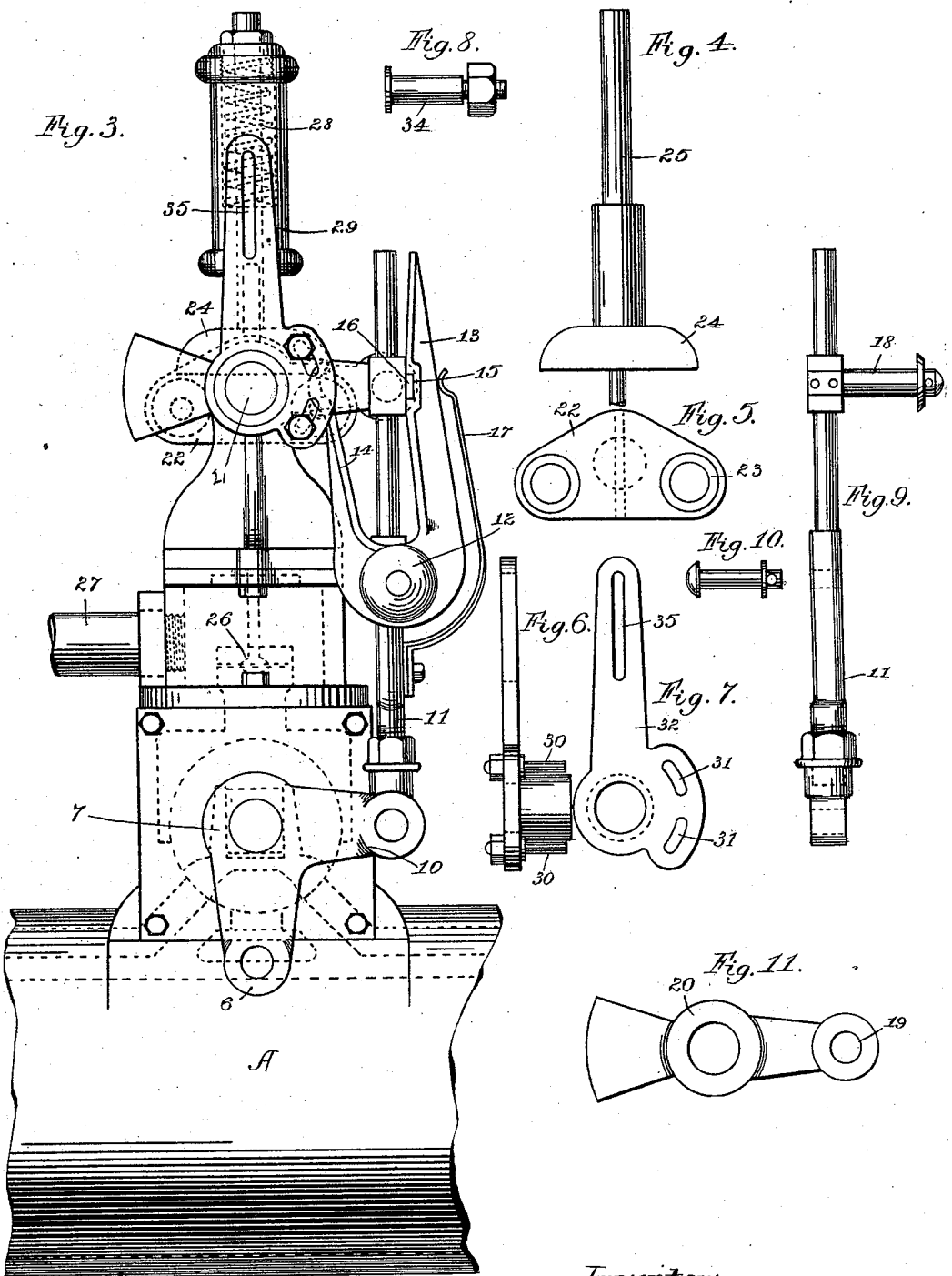

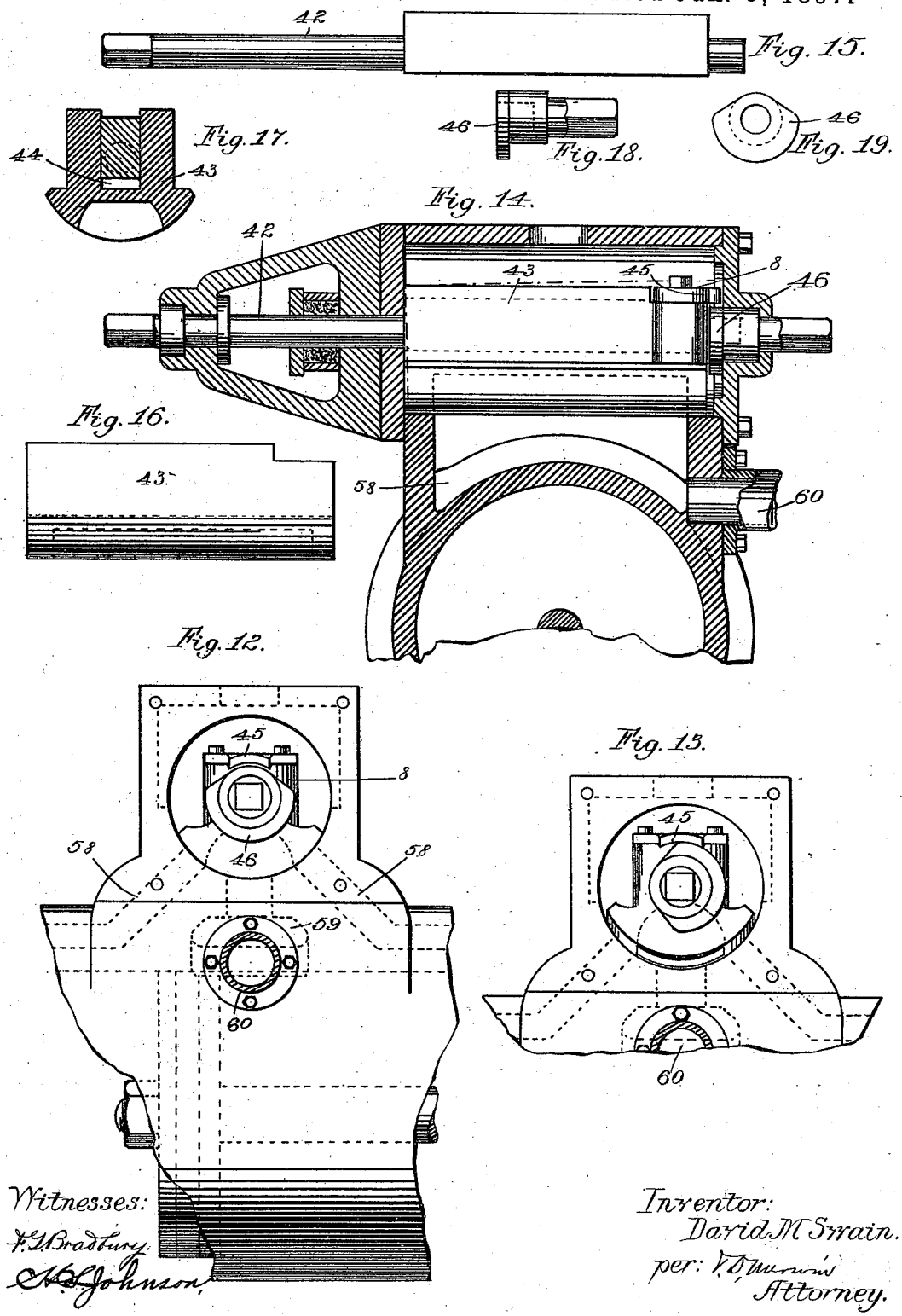

D. M. SWAIN.
VALVE GEAR AND ADJUSTABLE CUT-OFF.

No. 574,847. Patented Jan. 5, 1897.

Witnesses:
F. E. Bradbury.
H. S. Johnson.

Inventor:
David M. Swain.
per: Drury
Attorney.

(No Model.) 8 Sheets—Sheet 7.

D. M. SWAIN.
VALVE GEAR AND ADJUSTABLE CUT-OFF.

No. 574,847. Patented Jan. 5, 1897.

Witnesses:
F. G. Bradbury
H. S. Johnson

Inventor:
David M. Swain.
per: T. Thurwin
Attorney.

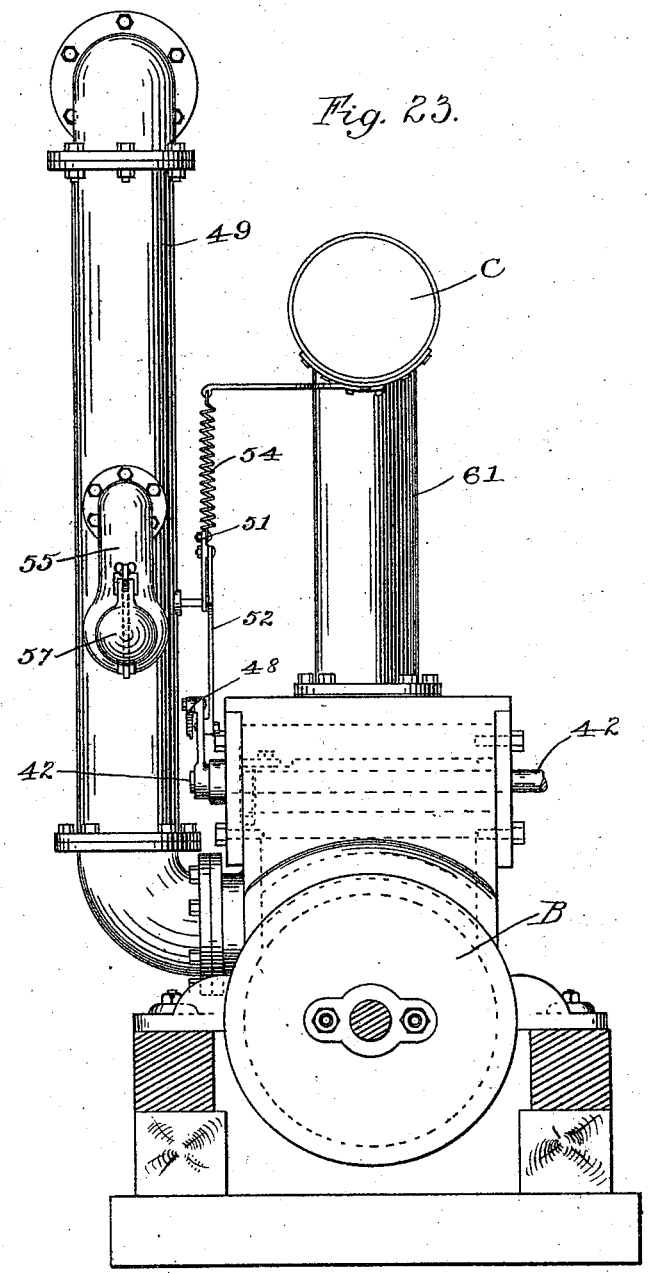

UNITED STATES PATENT OFFICE.

DAVID M. SWAIN, OF STILLWATER, MINNESOTA.

VALVE-GEAR AND ADJUSTABLE CUT-OFF.

SPECIFICATION forming part of Letters Patent No. 574,847, dated January 5, 1897.

Application filed June 29, 1895. Serial No. 554,423. (No model.)

*To all whom it may concern:*

Be it known that I, DAVID M. SWAIN, of Stillwater, Washington county, Minnesota, have invented certain Improvements in Valve-Gear and Adjustable Cut-Offs, of which the following is a specification.

My invention relates to improvements in slow-speed compound engines, its object being to provide an adjustable puppet-valve cut-off adapted to be easily adjusted to cut off the supply of steam to the piston while the engine is in motion, and also to provide means to permit blowing through to relieve the boilers from their pressure when the engine is at rest, clear the engine of water of condensation, and supply the second cylinder with steam for use in starting.

To this end my invention consists in providing a crab-claw, operatively connected with the main valve, adapted to pick up the cut-off at the beginning of each stroke, the crab-claw being unhooked at the point of cut off by means of operative connection with the cross-head. The main valves are provided with means for lifting them from their seats, so that steam can be blown through for the purposes stated. The exhaust-pipe leading to the condenser is provided with a valve operatively connected with the main-valve-lifting mechanism. This valve is adapted to be turned to close the pipe by the operation of the main-valve-lifting mechanism, so that the steam blown through the engine is compelled to pass out through a branch or by-pass pipe, which pipe is kept closed by a pressure-valve, so that the steam is prevented from leaving the engine until its pressure is greater than that of said valve. This prevents a vacuum in the cylinders and connections and retains sufficient steam in the second cylinder to supply it in starting without taking live steam direct from the boilers.

My invention further consists in the features of construction and combination hereinafter particularly described and claimed.

Figure 20:
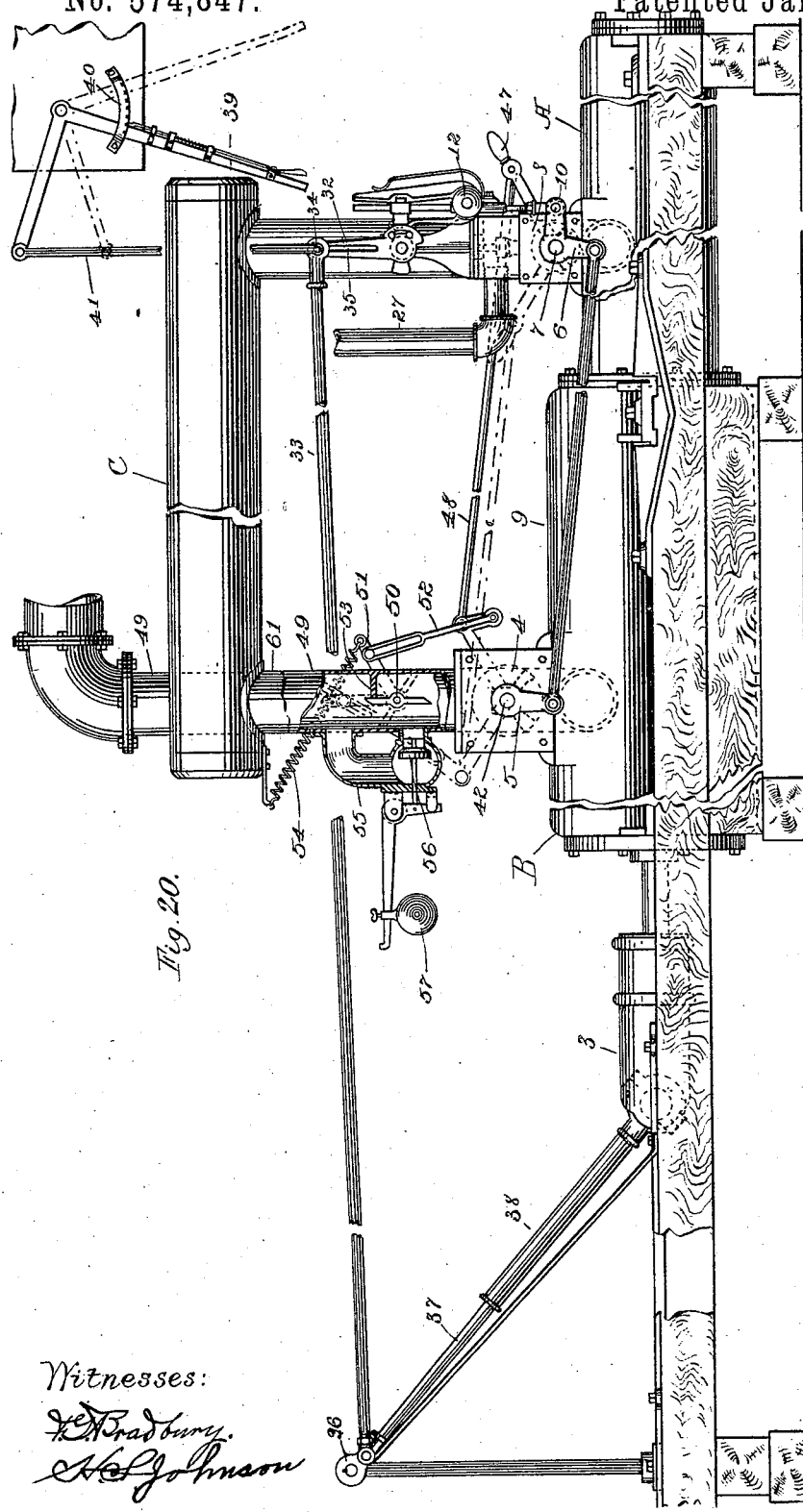
Figure 21:
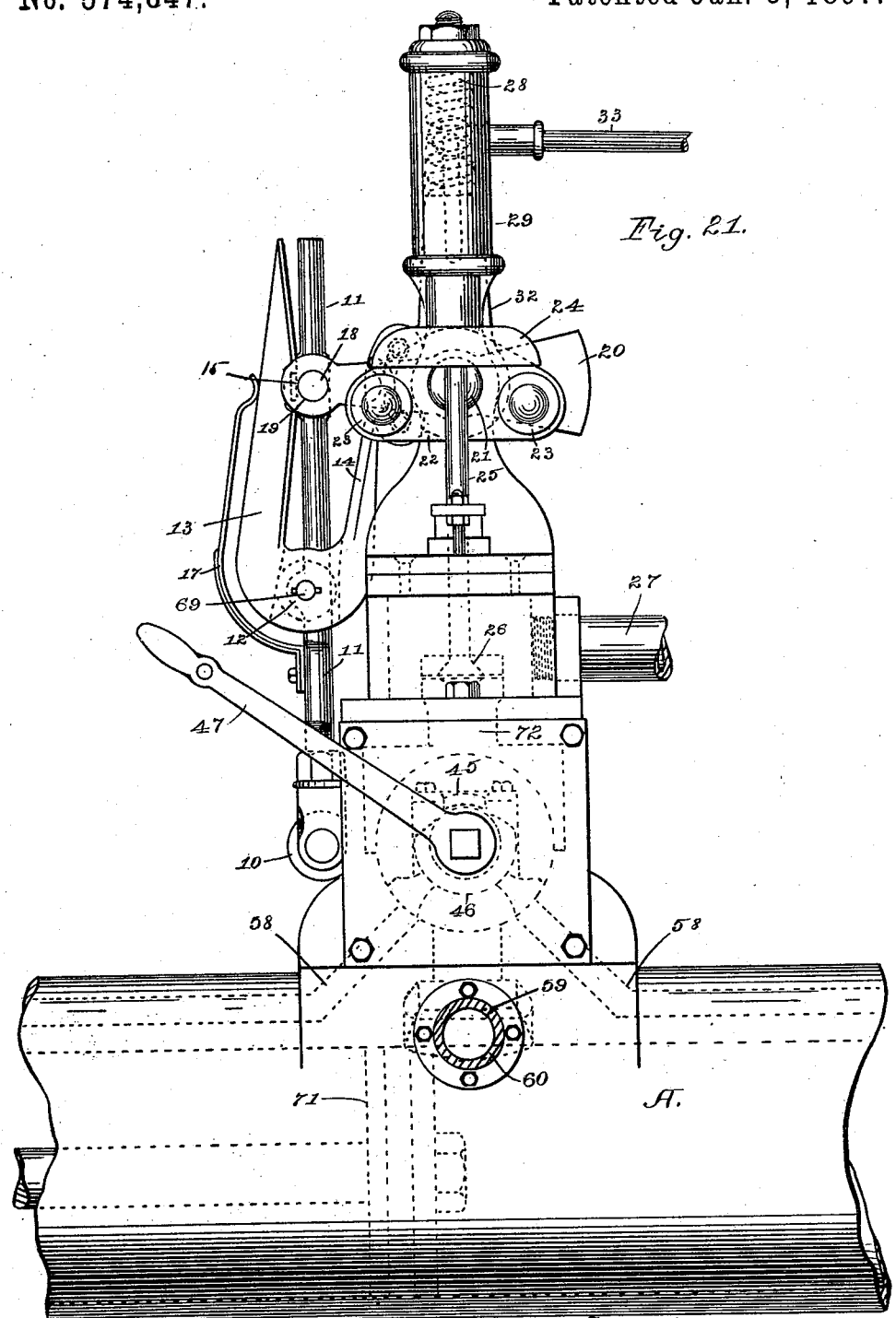
Figure 22:
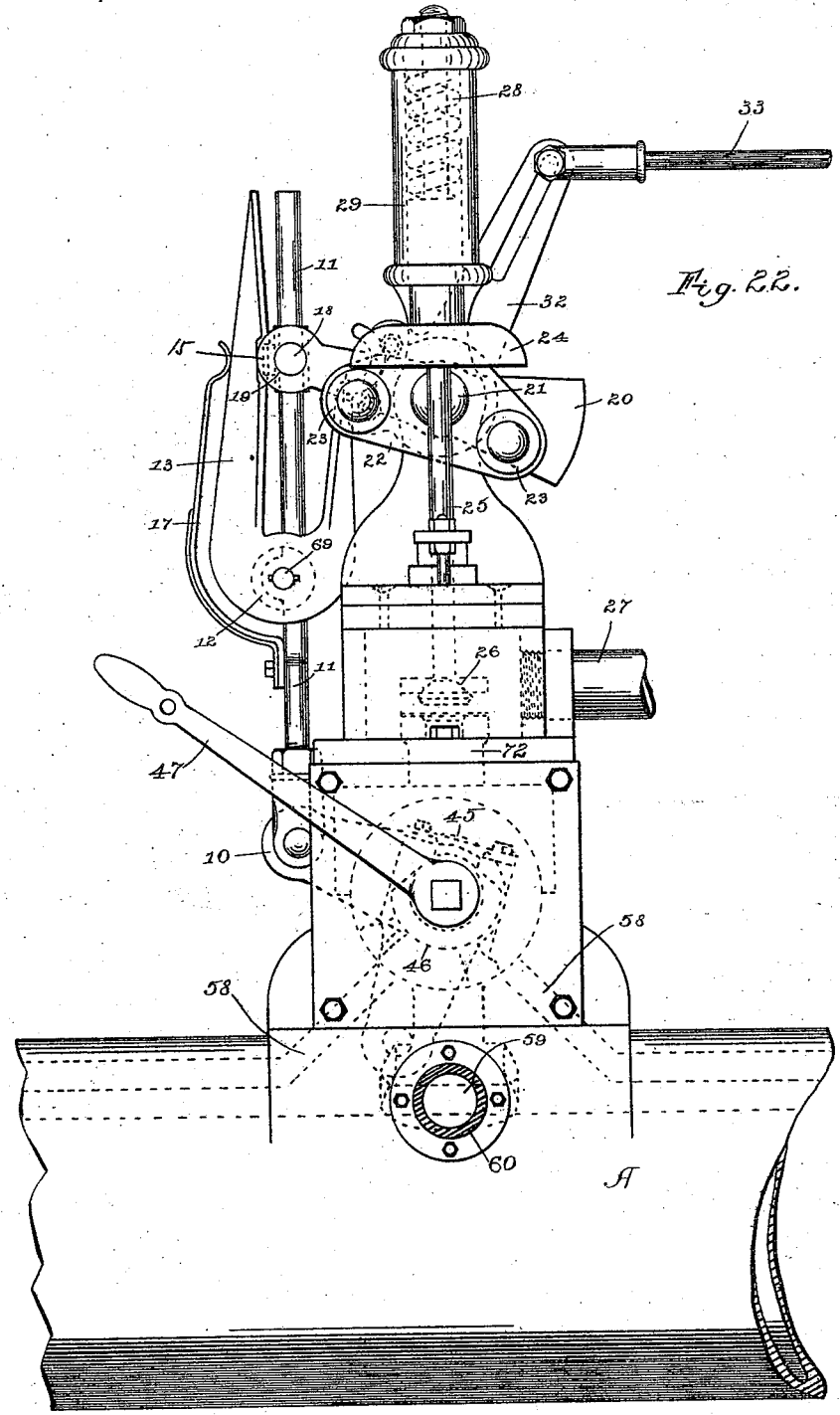

In the accompanying drawings, forming part of this specification, Figure 1 is a side elevation of an engine fitted with my improvements and showing the main shaft, crank, cam, and connections for operating the valves of the cylinders. Fig. 2 is an end view showing the high-pressure cylinder in section and illustrating the adjustable cut-off mechanism. Fig. 3 is a side view of the same, showing a portion of the cylinder. Fig. 4 is a detail of the puppet-valve stem, and Fig. 5 is a detail of the cross-arm for lifting the puppet-valve from its seat. Figs. 6 and 7 are details of the rocker-arm for unhooking the crab-claw at the point of cut off, and Fig. 8 is a detail of the pin connecting the rocker-arm and its operating parts. Fig. 9 is a detail of the crab-claw-carrying rod. Fig. 10 is a detail of the bolt for pivoting the claw thereon. Fig. 11 is a detail of the counterbalance-arm journaled upon the shaft carrying the puppet-valve lifter and operated by means of the crab-claw. Figs. 12 and 13 are end views of one of the main valves with the cover removed, showing the valve in normal position in Fig. 12 and raised from its seat in Fig. 13. Fig. 14 is a longitudinal vertical section of the same. Fig. 15 is a detail of the main-valve stem. Fig. 16 is a side view of the valve. Fig. 17 is a cross-section of the valve and stem, and Figs. 18 and 19 are details of the cam for lifting the valve from its seat. Fig. 20 is a partial side elevation of an engine fitted with my improvements, partly broken away to show the interior construction. Fig. 21 is a rear view of Fig. 3, showing the parts in mid-position. Fig. 22 is a similar view showing the puppet-valve lifter in tilted position and the main valve registering with one of the ports leading into the high-pressure cylinder; and Fig. 23 is an end view of the low-pressure cylinder and connected pipes.

In the drawings is shown a tandem two-cylinder compound engine of the ordinary type having the high-pressure cylinder A, the low-pressure cylinder B, and the intermediate expansion-chamber or receiver C. (See Fig. 20.) The cross-head 3 is provided with the ordinary pitman-rod 62, connected by means of the crank 63 with the shaft 64 of the paddle or fly wheel D. Fixed upon the opposite end of the shaft 64 is the round pointed cam 65, surrounded by the cam yoke or frame 66, longitudinally slidable in the bearings 67 and operatively connected with the main valve 4 of the low-pressure cylinder by means of the connecting-rod 68. The main valve 4 is provided with the crank-arm 5, connected to the arm 6 of the bell-crank 7 upon the high-pressure-valve cylinder 8 by means of the connecting-rod 9, so that the valve 8 is simultaneously cut off and on with the valve 4. Pivotally supported upon the arm 10 of the bell-crank is the vertical rod 11, upon which is pivoted, by means of the bolt 69, the crab-claw 12. This crab-claw is formed with two forks or arms 13 and 14, standing upon opposite sides of the rod, the arm 13 being provided with a notch 15 upon its inner face adapted to engage the block 16, sliding loosely upon the rod 11, and being normally held in engagement with the block by means of the spring 17. This block 16 is provided with a rearwardly-extending pin or stud 18, fitting loosely in the pin-hole 19 in the counterbalanced arm 20, secured upon the shaft 21, by the rocking of which shaft the puppet-valve is opened and closed. The shaft 21 has suitable journal-support in the horizontal arm 70 and carries upon its opposite end the cross-arm or lifter 22, provided with antifriction-rolls 23. With the rocking of the shaft 21 by means of the crab-claw these rolls 23 alternately engage the head or shoulder 24 upon the stem 25 of the puppet-valve 26, lifting the valve from its seat and permitting steam to enter from the steam-inlet pipe 27. (See Fig. 22.) The crab-claw then being released from the block 16, as hereinafter described, the puppet-valve is returned to its seat under the impulse of the coil-spring 28, arranged in the head 29, the shoulder 24 thrusting the lifter back to normal position and cutting off the inlet of steam. This rocks the shaft 21, and with it the counterbalanced arm 20, mounted thereon, carrying the connected block 16 back to mid-position upon the rod 11. In operation when the block has reached the adjusted limit of upward or downward movement upon the rod 11 to open the puppet valve the crab-claw comes in contact with one of the pins 30, secured in the slots 31 in the rocker-arm 32, thus releasing the claw from engagement with the block. The rocker-arm is rocked with each upward and downward movement of the crab-claw to bring its pins 30 alternately into engagement with the arm 14 of the claw by means of the operative connection with the cross-head 3. The connection consists of the rod 33, provided with a pin 34, fitting into the vertical slot 35 in the rocker-arm, the rod 33 being fulcrumed upon a suitable crank 36. This crank in turn is operatively connected to the cross-head by means of the telescoping rods 37 and 38, thus allowing the crank to be turned with each movement of the cross-head.

It will thus be seen that upon each upward and downward movement of the block 16 upon the rod 11 and the consequent opening of the puppet-valve, as described, the traveling of the cross-head, caused by the inlet of steam into the cylinder, operates the rocker-arm 32 to release the crab-claw and permit the return of the block to normal position, the puppet-valve thus being successively opened and closed to admit and cut off the supply of steam into the cylinder.

To adjust the movement of the rocker-arm to cause the puppet-valve to close earlier or later, as may be desired, I provide the bell-crank lever 39, suitably supported adjacent the engine and provided with an ordinary quadrant 40, the lever being connected to the end of the rod 33 by means of the depending arm 41. Thus by adjusting the position of the lever the pin 34 upon the end of the rod 33 will be moved upward or downward in the slot 35 of the rocker-arm, giving it greater or less angular movement, so that its pins will engage the crab-claw earlier or later in the stroke, effecting the cut-off at the point desired.

Fig. 22 shows the crab-claw in raised position, in which position by means of the interposed connections the puppet-valve lifter 22 is tilted, engaging the head 24 and opening the puppet-valve. It will thus be seen that as the main valve is rocked, as shown in Fig. 22, to register with one of the ports, 58, leading to the cylinder, the crab-claw is carried above mid-position, raising the block 16, rocking the shaft 21, and tilting the lifter 22, so that one of its rolls 23 engages the head 24, lifting the puppet-valve from its seat. The crab-claw is then unhooked at the point of cut-off desired by the pendulum motion from the cross-head and the puppet-valve closed, as hereinbefore described. By the time the piston has reached the end of its stroke the main valve is turned to register with the opposite one of the ports 58 by means of the ordinary connections, thus lowering the crab-claw below mid-position, which engages and carries with it the block 16, by means of which and the interposed connections the valve-lifter 22 is oppositely tilted, causing its other roll 23 to engage the head 24 and again open the puppet-valve, the puppet-valve thus being opened and steam admitted to the cylinder at the beginning of each forward and return stroke.

In order to blow through the engine to heat up the parts and prevent accumulation of condensation, I provide means for lifting the main valves from their seats, so as to leave a free passage through the engine for the steam. To this end each of the main-valve stems 42 as it passes through the valve-body 43 is flattened and fits into a similar groove 44 in the valve. Secured upon the end of the valve is a projecting lip or shoulder 45, adapted to be engaged by the eccentric 46, which is turned by means of the hand-lever 47 to lift the valve from its seat. The hand-lever is also connected with the main valve of the low-pressure cylinder by means of the connecting-rods 48, so as to simultaneously lift both valves.

Arranged in the exhaust-pipe 49 leading from the low-pressure cylinder is the butterfly-valve 50, the lever-arm 51 of which is connected with the rods 48 by means of the arm 52, whereby the valve is closed with the lifting of the main valves. This valve when open rests against the stop 53, and is held in open position against the tension of the spring by means of the lever 51.

When the valve-lifting mechanism is operated, the arm 51 assumes the position shown by dotted lines in Fig. 20, permitting the valve to be closed under the tension of the spring 54. In the operation of the valve-lifting mechanism the butterfly-valve in the exhaust-pipe is first closed under the tension of the spring 54, and the continued movement of the mechanism causes the eccentrics 46 to lift the main valves. The exhaust-pipe is thus closed before the main valves are lifted from their seats to permit steam to be blown through.

In order to prevent the steam leaving the engine when blowing through until it has reached a certain pressure, the exhaust-pipe 49 is provided with a branch or by-pass pipe 55, connecting the exhaust-pipe from a point below to a point above the valve, so that when the valve is closed the steam that is blown through is compelled to pass through this branch pipe. The opening from the main into the branch pipe is kept normally closed by the pressure-valve 56, held to its seat by means of the counterweight 57. The pressure with which the valve is held to its seat can thus be adjusted and the outlet of the steam regulated.

In use with the parts as shown in Fig. 22 steam enters through the puppet-valve, passing through the port 72 into the main valve, and through that one of the ports 58 with which the main valve registers into the cylinder. As the piston 71 reaches that end of its stroke the main valve, as hereinbefore described, is turned so as to register with the opposite port 58, the steam exhausting at the steam-port through which it entered, thence passing around the main valve, through the exhaust-port 59 and pipe 60, into the expansion-chamber or receiver C. From the chamber C it passes downward through the pipe 61 into the low-pressure cylinder. As the low-pressure-cylinder valve operates simultaneously with the high-pressure-cylinder valve, the steam exhausts from this cylinder in the same manner as from the high-pressure cylinder, and passes out through the outlet 49 to the condenser. (Not shown.)

Before starting up the engine the valve-lifting mechanism is operated, closing the exhaust-pipe 49 and lifting the main valves from their seats, as hereinbefore described. The throttle then being opened steam will be blown through the engine to heat up the parts and prevent accumulation of water of condensation. By means of the branch or by-pass pipe and its pressure-valve the steam below the pressure of the valve is retained in the receiver, so as to supply the low-pressure cylinder in starting without taking live steam from the boilers. This blowing-out feature is also of use when the engine is at rest to relieve the boiler from its pressure, maintain the heat of the engine, and clear it from the water of condensation, same as is practiced with puppet-valve engines.

The point of cut-off can be easily adjusted while the engine is in motion by means of the bell-crank lever 39, as hereinbefore explained, thus causing the steam to be used more or less expansively in the cylinder. It may also be further adjusted by setting the pins 30 in adjusted positions in their slots 31. (See Figs. 2, 6, and 7.)

I claim—

1. In an engine of the class described, the combination with the cylinder, its main valve and the inlet-port for said valve, of the puppet-valve closing said port, the adjustable cut-off for said valve, the crab-claw for picking up said cut-off at the beginning of each stroke, and the operative connection between said claw and main valve.

2. In an engine of the class described, the combination with the cylinder, its main valve and the inlet-port for said valve, of the puppet-valve controlling the inlet of steam to the main valve, the crab-claw for actuating said puppet-valve, the operative connection between said claw and main valve, the tripping attachment for said crab-claw, and the pendulum attachment operatively connecting said tripping attachment with the cross-head.

3. In an engine of the class described, the combination with a cylinder, its main valve, and the inlet-port for said valve, the puppet-valve closing said port and the crab-claw for actuating said puppet-valve, of the rocker-arm, the operative connection between said arm and the cross-head, and the projections upon said arm for tripping said crab-claw.

4. In an engine of the class described, the combination with the cylinder, its main valve and inlet-port, the puppet-valve for controlling the inlet of steam to said main valve, and the crab-claw for operating said puppet-valve, of the rocker-arm adapted to engage and trip said crab-claw, the operative pendulum attachment connecting said rocker-arm to the cross-head, and the means for adjusting the point of connection of said attachment with the rocker-arm so as to vary the point of cut-off.

5. In an engine of the class described, the combination with the cylinder, its main valve and inlet-port, the puppet-valve for closing said inlet-port, and the crab-claw for operating said puppet-valve, of the rocker-arm, the studs upon said arm adapted to engage and trip said crab-claw, the rock-shaft connected to the cross-head, the crank upon the rock-shaft, the rod operatively connecting said crank with the rocker-arm, and means for adjusting the point of connection of said rod to and from the axis of rotation of said arm.

6. In an engine of the class described, the combination with the cylinder, its main valve and inlet-port, of the puppet-valve for closing the inlet of steam to the main valve, the crab-claw, the operative connection between said crab-claw and main valve, the rock-shaft operated by said crab-claw, the cross-arm upon said rock-shaft, and the projections upon said cross-arm adapted to engage the puppet-valve stem, and the controlling valve-spring.

7. In an engine of the class described, the combination with the cylinder, its main valve and inlet-port, the puppet-valve for controlling the inlet of steam to said main valve, and the crab-claw for actuating said puppet-valve, of the rocker-arm adapted to engage said crab-claw to trip the same, the operative connection between said rocker-arm and the cross-head, and means for adjusting the connection between the same and the rocker-arm to vary the point of cut-off.

8. In a double-expansion engine, the combination with the high and low pressure cylinders, the interposed receiver and the exhaust-pipe, of the valve in said exhaust-pipe, the by-pass pipe connecting the exhaust-pipe on opposite sides of said valve, the pressure-valve in said by-pass pipe, and the means for opening the main valves of said cylinders and closing said exhaust-pipe valve.

9. In an engine of the class described, the combination with the high and low pressure cylinders, the interposed expansion-chamber, the exhaust-pipe, the valve arranged therein, the by-pass pipe, its pressure-valve and the main valves of the cylinders, of the eccentrics for tilting said valves to lift the same from their seats, the cranks upon said eccentrics, their connecting-rod and the connection between the same and said exhaust-pipe valve, whereby when said main valves are lifted from their seats the valve in said exhaust-pipe is closed so as to permit the flowing of steam through said main valves, while retaining a predetermined pressure in the expansion-chamber for use in the low-pressure cylinder in starting.

10. In an engine of the class described, the combination with the main valves, the low-pressure cylinder and the exhaust-pipe leading from said cylinder, of the means for lifting said valves from their seats, and the means operated by said valve-lifting means for closing said exhaust-pipe to the outlet of steam below a certain pressure, but permitting the outlet of steam above such pressure.

In testimony whereof I affix my signature in presence of two witnesses.

DAVID M. SWAIN.

Witnesses:
H. S. JOHNSON,
MINNIE L. THAUWALD.